July 4, 1950   J. R. HICKS ET AL   2,514,059
COUPLING DEVICE
Filed May 18, 1944

INVENTORS
James R. Hicks
Raymond S. Ellis
BY
E. C. Sanborn
Attorney

Patented July 4, 1950

2,514,059

UNITED STATES PATENT OFFICE 2,514,059

COUPLING DEVICE

James R. Hicks, Waterbury, and Raymond S. Ellis, Watertown, Conn., assignors to The Bristol Company, Waterbury, Conn., a corporation of Connecticut Application May 18, 1944, Serial No. 536,072

4 Claims. (Cl. 285—90)

The invention relates to coupling devices for flexible metallic hose, and more especially to a coupling which may be applied to a section of such hose by purely mechanical means, and without the necessity of soldering, brazing, welding or other applications of high temperature.

In the interconnection of sections of flexible metallic hose of the bellows type, or in the provision of solid couplings, whereby such hose may be connected to a rigid piping system or to a pressure vessel, there arises the problem of providing ready means for establishing such connection without the need of highly specialized tools or of treatment involving the subjection of portions of the flexible hose to high temperatures.

It is an object of the present invention to provide a coupling, whereby a section of flexible metallic hose may be quickly and positively connected to a rigid structure by purely mechanical means.

It is a further object to provide a coupling of the above class, which may be repeatedly disassembled and re-assembled.

It is a further object to provide a coupling of the above nature adapted to installation within a restricted space.

It is a further object to provide a coupling of the above nature adapted to installation with a minimum sacrifice of desired flexibility in the portions of metallic hose to which it is applied.

It is a further object to provide a coupling of the above nature which may be adapted to constraint of flexibility of the connected portion to a single plane of motion.

It is a further object to provide a coupling of the above nature which is free from the tendency to change its longitudinal dimensions under the influence of tension or compression.

It is a further object to provide a coupling which, while flexible, shall have a minimum tendency to develop kinks and sharp bends.

In carrying out the purposes of the invention, it is proposed to provide a clamping fitting adapted to coaction with a section of flexible metallic hose of the so-called "annular convolution" type (as contrasted to that type in which the convolution forms a continuous helix) and to engage one or more convolutions at the extremity of said section, and longitudinally to compress and maintain the same in fluid-tight engagement with a solid fitting to which said hose is to be connected. In view of the circumferential nature of the grooves characterizing this class of metallic hose, the portions of the coacting fitting are divided upon a plane substantially within which lies the axis of the hose. By this expedient said fittings may be laterally applied, and afterwards retained in place by suitable constraining means. For the purpose of restricting flexure to a single plane, provision is made for connecting the clamping fittings at opposite extremities of the section of flexible hose by means of diametrically opposed resilient rods, strips, or wire of spring material, which also serve to prevent longitudinal changes in the dimensions of the coupling, and also to reduce the tendency toward the development of kinks or sharp bends.

In the drawings, Fig. 1 is a side elevation, partly in section, of a flexible coupling embodying the principles of the invention.

Figure 1:
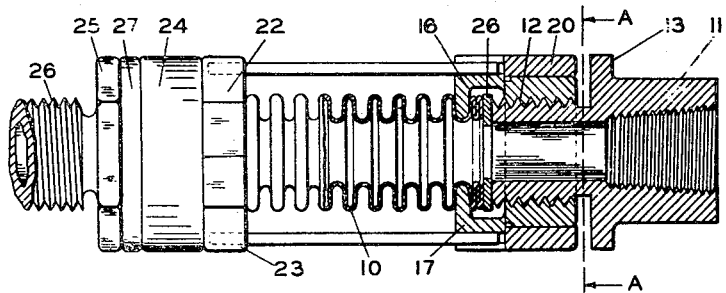
Figure 2:
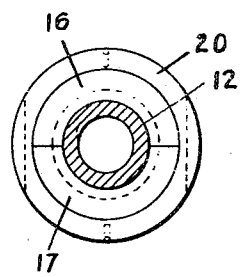
Fig. 2 is an end elevation, partly in section, taken on the line A—A in Fig. 1.

Referring now to the drawings: In Figs. 1 and 2 is shown a flexible coupling embodying the principles of the invention. The numeral 10 designates a portion of flexible metallic hose of the bellows type, having annular convolutions, to which it is required to fit solid portions, whereby there may be constituted a flexible tubular coupling between said portions. A terminal fitting 11 is provided with a threaded annular portion 12, having a flattened end adapted to be juxtaposed to a severed and trimmed end of the metallic hose 10. The portion of the fitting 11 remote from the threaded part 12 may be provided with a conventional pipe thread as shown, or may be otherwise adapted to rigid connection to a tubular or hollow structure to which it is required that external connection be made. It is desirable that the fitting 11 be provided with an enlarged portion 13 of hexagonal section, or the equivalent, for engagement by a suitable wrench or spanner to facilitate assembly of the coupling.

Two identical elements 16 and 17, each of substantially semicircular conformation, have, formed upon the interior surfaces, complementary portions of an internal thread, adapted, when said elements are juxtaposed with their flat faces 16', 17' together, to provide a split nut adapted for engagement with the threaded portion 12 of the fitting 11. Also formed upon the interior curved faces of the elements 16 and 17 are portions 18 and 19 respectively of an internally directed flange having rounded edges and adapted to enter the space between two convolutions of the flexible hose portion 10, after the same have been separated by a suitable spreading tool. The portions of the elements 16 and 17 exterior to the threaded parts are formed to a smooth surface of cylindrical curvature such that when said elements are placed in engagement to form a nut, said surfaces will have a truly circular conformation. A solid ring 20, bored on the interior to have a curvature corresponding to the exterior surface of the elements 16 and 17, is adapted to be forced over said surface when said elements are in engagement, whereby to coordinate them into an integral element having a continuous thread adapted to engagement with the threaded portion of the fitting 11. The elements 16 and 17 may have formed upon their exterior surfaces flattened portions 21, adaptable to engagement by a wrench, whereby when said elements are coordinated into an integral nut the same may be effectively tightened upon the threaded portion 12 of the fitting 11.

Where it is required only to provide a coupling between a rigid structure, such as a standard piping system, and a section of flexible hose of indeterminate length, the combination as thus far described constitutes the only necessary apparatus; and a fluid-tight joint may be made according to the method presently to be described. Where it is desired that there be provided between two rigid bodies a coupling of limited invariable length, flexible for deflection through a small angle in one plane, and substantially inflexible in all other directions, there is selected a portion 10 of flexible metallic hose suited to the dimensions of the fitting 11 and associated parts as hereinabove described, and of a length suited to the distance to be maintained between said bodies. One end of said hose portion being adapted to connection to the cooperating elements described, the remote end is provided with an assembly similar in all respects to that set forth, whereby to form a further rigid connection. This comprises semicircular portions 22 and 23 identical in all respects with the portions 16 and 17, together with a solid ring 24 identical with the ring 20 and adapted for maintaining the portions 22 and 23 in definite engagement to form a split nut. A solid fitting 25 similar to the fitting 11 is provided with an internally projecting threaded portion, not shown in the drawings, but identical to the portion 12 of the fitting 11, adapted to engage the internal thread formed by the coacting elements 22 and 23. The fitting 25 may be provided with any convenient means for external connection; and, while this may be an internal thread similar to that in the fitting 11, it is here shown as an external threaded portion 25 adapted for engagement by a suitable nut.

The elements 16 and 17 are provided with diametrically opposed slots 30 and 31 formed, as by milling, at points 90 degrees removed from the plane surfaces 16', 17' of said elements; and similar slots are formed in the corresponding parts of the elements 22 and 23. Placed in said slots, and secured therein, as by soldering or brazing, are resilient metallic strips 32 and 33 of spring steel or the like, adapted for bending through a limited angle in a sense parallel to the planes of said surfaces, and at the same time to inhibit substantial bending in planes transverse to the planes of said surfaces, as well as to maintain a fixed degree of longitudinal separation between the elements to which they are respectively attached, thus constituting a pair of clamping members adapted to cooperate with a suitable length of metallic hose in carrying out the purposes of the invention.

The selected portion of hose, being suitably trimmed at its extremities, and at a distance apart determined by the spacing of the internal flange members on the spaced-apart semicircular half-nuts, the interstices between adjacent convolutions are opened by means of a suitable spreading tool, and the flanges placed in said interstices, the flat surfaces 16', 17' of elements being brought into engagement, providing complete encirclement of the ends of the flexible metallic hose portion, and the internally threaded portions of said elements combining to form a thread for engagement by the threaded portions of the fittings 11 and 25. The rings 20 and 24 are forced over the cylindrical surfaces of the corresponding nut-elements, incorporating each into a complete unit, after which the fittings are screwed into place, engaging the convolutions of the flexible hose portion which lie between the ends of the fittings and the corresponding internal flanges, and compressing said convolutions between said flattened faces and said flanges. If desired, there may be placed between the end of each fitting and the compressed convolutions of the flexible metallic hose a washer or gasket, as shown at 26 in Fig. 1, whereby in some instances to improve the joint so formed. There may also if desired be provided a resilient washer as shown at 27 in Fig. 1, interposed between the retaining ring and the enlarged portion of the solid fitting, whereby to exert an axial constraint between said fitting and ring, effectively preventing any tendency of the latter to shift out of complete retaining engagement with the semicircular elements.

Figure 3:
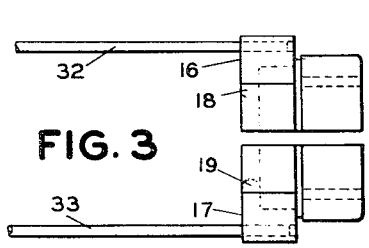
Figs. 3 and 4 are side and end elevations, respectively, of certain elements of the device shown in Fig. 1.
Figure 4:
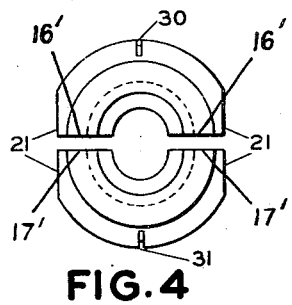
Figure 5:
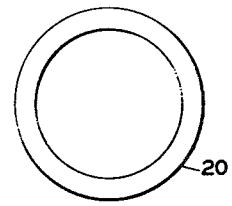
Fig. 5 is an end elevation of an element adapted to coact with the elements shown in Figs. 3 and 4 in effecting the purpose of the invention.
Figure 6:
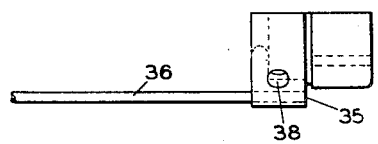
Figs. 6 and 7 are side and end elevations, respectively, of a type of element which may be substituted for the elements shown in Figs. 3 and 4.
Figure 7:
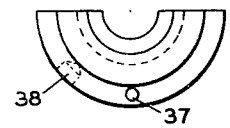

In Figs. 6 and 7 is shown a form of clamping member which may be used alternatively with those shown in Figs. 3 and 4 for the purpose of providing a flexible connection of fixed length between two solid fittings in the same manner as said last-named members are used. A semicircular element 35 is formed similar in all respects to either of the elements 16—17, with the exception that instead of a flat strap of resilient material secured in a slot for the purpose of establishing connection to the similar element at the remote end of the coupling, there is provided a wire 36 of spring steel, or equivalent material having circular cross section, said wire being secured in a hole 37 drilled in the material of the fitting 35. A further feature wherein the member shown in Figs. 6 and 7 differs from those shown in Figs. 3 and 4 is found in the omission of the flattened surfaces 21 shown in Fig. 4, and the provision of a radial opening 38 formed in the outer periphery of the fitting and adapted to engagement by a suitable spanner for the purpose of rotating the element, when combined with similar part to form a complete nut for coacting with the externally threaded portion of the solid fitting. It is understood that the replacement of the flat surfaces 21 by the opening 38 is not necessarily restricted to that form of element which is provided with the wire 36 instead of a flat strip of spring material, but is adapted to any form of interconnection within the spirit of the invention, and that said elements may be provided with any superficial conformation adapted to engagement by a suitable wrench or spanner.

Figure 8:
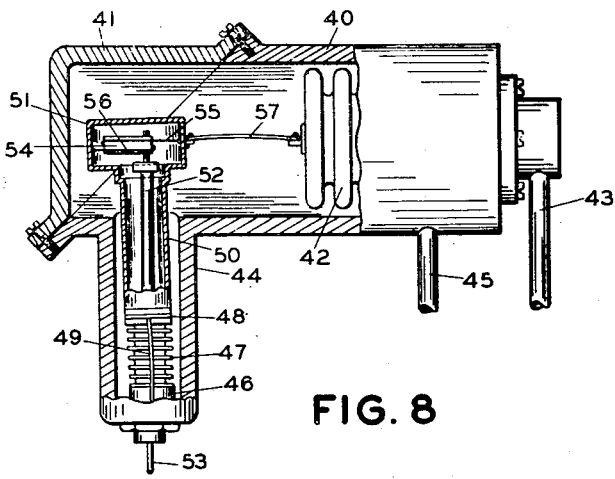
Fig. 8 is a side elevation partly in section, and to a reduced scale, of a differential manometer incorporating in its structure a coupling involving the invention.

There has thus been provided for flexible metallic hose of the "annular convolution" type a coupling whereby to produce a fluid tight seal between said hose and a rigid structure, with a minimum number of component parts, and one which, by virtue of the incorporation of the functions of an internally directed flange and a split nut in a common element, effects the desired result by means of an assembly having a minimum diameter in excess of that of the hose material, and is hence adapted to use in restricted spaces. As an example of the special adaptability of a coupling of the type incorporating the principles of the invention to use in a restricted space, there is shown in Fig. 8 a view, partly in section, of a differential fluid-pressure meter utilizing such a coupling member as a flexible seal between internal and atmospheric pressure. This type of instrument is fully disclosed and claimed in copending application Serial No. 483,824, filed April 20, 1943, by James R. Hicks, one of the present applicants, now Patent No. 2,441,882.

Referring to Fig. 8, the numeral 40 designates an extended shell, housing or meter body adapted to contain elements of a measuring instrumentality presently to be described, and having a removable cover-plate 41, whereby access may be had to said elements. Internally attached to one end of said housing is a closed expansible bellows member 42 having its interior in communication with a conduit 43, and adapted to vary its linear dimensions in correspondence with the difference in magnitude between a fluid pressure interiorly applied through said conduit and pressure applied to the outside surface of said bellows. Laterally extending from the housing 40 near its extremity remote from the attachment of the bellows member 42 is a tubular projection 44, having a flattened outer end with an aperture therein adapted for mounting of certain elements of the mechanism. A conduit member 45 communicating with the interior of the shell or housing 40 provides for the external application of fluid pressure to the bellows member 42, so that the magnitude of the difference between pressures in the conduits 43 and 45 will be expressed by a linear deformation of said member within the housing 40. Secured to the inner face of the projecting portion 44 is the solid end fitting 46 of a flexible coupling member similar to that shown in Fig. 1, and including a section of metallic hose 47, and a further solid fitting 48, said fitting and hose being coordinated into a flexible tubular structure according to the manner hereinbefore set forth. Diametrically opposed strips or wires 49 of spring material (only one of which appears in the drawing) serve to maintain the solid fittings 46 and 47 at a fixed distance apart, and to limit the flexure of the coupling element to a direction substantially parallel to the line of deflection of the bellows member 42 with changes in differential pressure to which said member is subjected. In other words, the longitudinal axis of said coupling element can flex only in a plane substantially perpendicular to the plane passing through said strips or wires 49, said perpendicular plane either passing through or extending substantially parallel to the longitudinal axis of the bellows 42.

Secured to the fitting 48 is a tubular structure 50, extending into the main body of the housing 40, and terminating in an enlarged head portion 51, said structure and head portion, together with the flexible coupling, forming an inner shell or housing, movable through a limited angle as permitted by the flexible hose portion 47 and constrained by the strips 49. The interior of said inner shell or housing is in free communication with the atmosphere through the aperture in the end of the projection 44, and is completely sealed from the interior of the housing 40. Rigidly mounted on the end of the projection 44 and extending within the inner shell or housing as above constituted is a support 52 having journalled therein a shaft member 53 for free rotation, and extending through the mounting in the aperture at the end of the projection 44, and externally of the meter body adapted for attachment of an index, pointer, or other instrumentality, not shown in the drawing, whereby to measure or otherwise utilize the angular deflection of said shaft member. Carried by the inner end of the shaft member 53, within the enlarged portion 51 of the inner movable housing, is a drum or sector member 54, said sector member being operatively connected to the interior walls of the enlarged portion 51 by link members 55 whereby motion of the inner housing in its plane of freedom will impart angular motion to said sector member and thereby to the shaft member 53. A flexible link 57 provides operative connection between the inner extremity of the bellows member 42 and the outer surface of the head portion 51, to cause said head portion to partake of deflections of said bellows member with variations in differential pressure to which the same is subjected. Thus, the deflected position of the inner housing in the plane of motion permitted by the flexible coupling will be representative of the magnitude of the differential pressure between the conduits 43 and 45, and this, being communicated through the links 55 and 56 to the sector member 54 and thereby to the shaft 53, will impart to the latter a proportional angular deflection, which will be a measure of the differential pressure.

While no invention is herein claimed for the differential pressure gauge, all of which is covered in the hereinbefore mentioned Hicks application, Serial No. 483,824, it will be apparent that the form of flexible member covered by the present invention is especially applicable to that form of apparatus. The outstanding advantages accruing to said member in its designated use both in accordance with the principles of the invention, and as fully demonstrated by experiment, may be summarized as follows: (1) The coupling may be assembled, and disassembled without the use of brazing, soldering, or welding processes. (2) The small over-all diameter of the unit, as compared with other mechanical types not having integral parts each of which combines the nut and flange functions, lends itself to use in the relatively restricted space provided within the meter body or housing. (3) Constraint of flexure to a single plane improves accuracy of measurement, and also inhibits undesirable vibration in other planes. (4) The definite length established by the resilient reinforcing strips or wire effectually prevents longitudinal deformation with variation of static pressure within the meter body and thus prevents such misalignment of the interior mechanism as might take place under extreme pressures in forms of flow meter not so equipped.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A flexible tubular structure comprising a section of corrugated metallic tubing provided at each of its extremities with fittings comprising split nuts, the separating surfaces of said respective nuts lying substantially in a common plane, and resilient extended members of fixed length, each integrally connecting corresponding parts of said fittings at opposite extremities of said tubing and extending between points on the same side of said plane, whereby to inhibit deformation of said tubing section under longitudinal stress while enabling flexure of said section in a given plane.

2. A flexible tubular structure comprising a section of corrugated metallic tubing provided at each of its extremities with fittings comprising split nuts, the separating surfaces of said nuts lying substantially in a common plane, and resilient extended members, each integrally connecting corresponding parts of said fittings at opposite extremities of said tubing and extending between points on the same side of said plane, said resilient members lying substantially in a plane diametric to said fittings and intersecting said separating plane, whereby to inhibit flexure of said tubing in a sense parallel to the plane containing said resilient members while enabling limited flexure in a sense normal to the same.

3. A flexible tubular structure comprising a section of corrugated metallic tubing having at each of its extremities coupling means comprising complemental split nut elements of substantially semi-circular formation and means for integrating said elements into coupled relation to said tubing, corresponding semi-circular portions of said coupling means being integrally interconnected by means of diametrically opposed resilient members non-deformable in a longitudinal sense, whereby to permit limited flexure of said tubing in a plane perpendicular to that containing said members and to inhibit flexure in said containing plane, and at the same time to inhibit deformation of said tubing under longitudinal stress.

4. In a differential-pressure-responsive measuring instrument, a casing, an element within said casing responsive to a differential pressure, a flexible tubular structure in said casing comprising a section of flexible metal tubing provided at its extremities with rigid fittings, one of said fittings being secured to a wall of said casing, means connecting the other of said fittings to said differential-pressure-responsive element for movement therewith, and means comprising members extending between said fittings and integrally secured thereto for enabling flexure of said tubing in a given plane to permit movement of the last-mentioned fitting with said differential-pressure-responsive element while inhibiting flexure of said tubing in other planes, said members also being longitudinally rigid to inhibit deformation of said tubing under longitudinal stress.

JAMES R. HICKS.
RAYMOND S. ELLIS.

REFERENCES CITED

The following references are of record in the file of this patent:

UNITED STATES PATENTS

| Number | Name | Date |
|---|---|---|
| 540,102 | Kirshman | May 28, 1895 |
| 932,805 | McLaughlin | Aug. 31, 1909 |
| 1,038,012 | Sobey | Sept. 10, 1912 |
| 1,191,486 | Tyler | July 18, 1916 |
| 2,014,355 | Hussman | Sept. 10, 1935 |
| 2,335,478 | Bergman | Nov. 30, 1943 |